(12) United States Patent
Biswas et al.

(10) Patent No.: US 11,745,358 B2
(45) Date of Patent: *Sep. 5, 2023

(54) ROBOTIC APPARATUS FOR OPERATING ON FIXED FRAMES

(71) Applicant: Google LLC, Mountain View, CA (US)

(72) Inventors: Shubhabrata Biswas, Cupertino, CA (US); Samuel Gardner Garrett, Seattle, WA (US); Dhruv Dipak Gajaria, Campbell, CA (US)

(73) Assignee: Google LLC, Mountain View, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/400,639

(22) Filed: Aug. 12, 2021

(65) Prior Publication Data

US 2021/0370521 A1    Dec. 2, 2021

Related U.S. Application Data

(63) Continuation of application No. 16/542,935, filed on Aug. 16, 2019, now Pat. No. 11,117,267.

(51) Int. Cl.
| | | |
|---|---|---|
| *B25J 9/00* | (2006.01) | |
| *B25J 9/16* | (2006.01) | |
| *B25J 13/08* | (2006.01) | |
| *B25J 9/06* | (2006.01) | |
| *B25J 17/02* | (2006.01) | |

(52) U.S. Cl.
CPC ............. *B25J 13/089* (2013.01); *B25J 9/009* (2013.01); *B25J 9/0087* (2013.01); *B25J 9/065* (2013.01); *B25J 9/1612* (2013.01); *B25J 17/0283* (2013.01)

(58) Field of Classification Search
CPC ........ B25J 13/089; B25J 9/0087; B25J 9/009; B25J 9/065; B25J 9/1612; B25J 17/0283
See application file for complete search history.

(56) References Cited

U.S. PATENT DOCUMENTS

| | | | |
|---|---|---|---|
| 4,954,952 | A | 9/1990 | Ubhayakar et al. |
| 4,998,442 | A | 3/1991 | Brown et al. |
| 5,145,130 | A | 9/1992 | Purves |
| 5,257,669 | A | 11/1993 | Kerley et al. |
| 6,831,436 | B2 | 12/2004 | Gonzalez |
| 8,534,395 | B2 | 9/2013 | Niederberger |
| 8,924,018 | B2 | 12/2014 | Lee et al. |
| 9,327,784 | B2 | 5/2016 | Bagheri et al. |
| 9,827,677 | B1 * | 11/2017 | Gilbertson ............... B25J 9/046 |

(Continued)

FOREIGN PATENT DOCUMENTS

| | | |
|---|---|---|
| CN | 101947786 A | 1/2011 |
| WO | WO 2002/055271 | 7/2002 |
| WO | WO 2018/005346 | 1/2018 |

OTHER PUBLICATIONS

EP Extended Search Report in European Application No. 20191164.1, dated Dec. 14, 2020, 9 pages.

(Continued)

*Primary Examiner* — Kira Nguyen
(74) *Attorney, Agent, or Firm* — Fish & Richardson P.C.

(57) ABSTRACT

A robotic apparatus including a plurality of rigid body sections that move relative to each other by one or more multi-degree of freedom joints. The robotic apparatus can traverse a fixed frame by attaching its distal ends to the frame and moving the rigid body sections relative to each other.

9 Claims, 4 Drawing Sheets

(56) References Cited

U.S. PATENT DOCUMENTS

| | | | |
|---|---|---|---|
| 9,827,678 B1 | 11/2017 | Gilbertson | |
| 2005/0036879 A1* | 2/2005 | Jhaveri | B25J 9/0084 |
| | | | 414/751.1 |
| 2015/0081092 A1* | 3/2015 | Jacobsen | B25J 5/007 |
| | | | 901/1 |
| 2016/0184996 A1* | 6/2016 | Ishige | B25J 9/1692 |
| | | | 700/254 |
| 2017/0267452 A1 | 9/2017 | Goren et al. | |
| 2018/0020978 A1 | 1/2018 | Kaifosh et al. | |
| 2018/0112583 A1* | 4/2018 | Okamoto | B01D 53/9477 |

OTHER PUBLICATIONS

Office Action in European Appln. No. 20191164.1, dated Feb. 22, 2023, 8 pages.

Office Action in Chinese Appln. No. 202010817737.8, dated Jan. 9, 2023, 25 pages (with English Translation).

\* cited by examiner

ROBOTIC APPARATUS FOR OPERATING ON FIXED FRAMES

CROSS-REFERENCE TO RELATED APPLICATION

This application is a continuation of U.S. application Ser. No. 16/542,935, filed on Aug. 16, 2019. The disclosures of the prior application are considered part of and are incorporated by reference in the disclosure of this application.

BACKGROUND

This specification relates to robotic apparatus.

Large storage facilities such as warehouses and data centers typically adopt various forms of robotic automation for material delivery and handling. However, these facilities have become massive spaces that are thousands of square meters. Conventional industrial automation robots on wheels are limited in how quickly they can travel from one location to another due to the structure of aisles and walkways. Having to travel within the pathways of existing aisles (which are designed for humans to move within these facilities) limits the speeds of conventional robots which then limits the number of machines and racks they can serve. Additionally, robots operating on floor level generally raise safety concerns due to possible collisions with other fixed objects or humans.

As another form of robotic automation, gantry robots that operate on an overhead system above floor level, while mitigating certain deficiencies, are limited in both the size of reachable work areas and the efficiency to operate within these areas, as their movements are confined by the pre-installed gantries. Furthermore, the installation and maintenance of the overhead system requires significant additional capital investment.

SUMMARY

This specification describes technologies relating to robot apparatuses with multi-degree of freedom joints that can traverse a fixed frame. In general, one innovative aspect of the subject matter described in this specification can be embodied in methods performed by a robotic apparatus that include the actions of moving a plurality of rigid body sections relative to each other by one or more multi-degree of freedom joints, wherein: each rigid body section has a pair of first and second distal portions that are oppositely disposed from each other along the rigid body section; each rigid body section defines a longitudinal axis that runs a length of the rigid body section and intercepts each of the first distal portion and second distal portion; and each multi-degree of freedom joint directly couples a respective pair of rigid body sections; connecting a first end effector to a first distal portion of a first rigid body section, wherein a second distal portion of the first rigid body section is connected to a multi-degree of freedom joint; connecting a second end effector to a first distal portion of a second rigid body section, wherein a second distal portion of the second rigid body section is connected to a multi-degree of freedom joint; wherein: each of the first and second end effectors is configured to attach to a fixed frame, and is also configured to attach to movable objects; and cooperatively operating the one or more multi-degree of freedom joints and the first and second end effectors to cause the robotic apparatus to traverse the fixed frame by alternating attachment to the fixed frame by the first and second end effectors, and to pick and place the movable objects at target positions relative to the fixed frame.

The methods may further comprise receiving power from a bus bar by the robotic apparatus when either the first end effector or the second end effector is electrically coupled to the bus bar, wherein each of the first and second end effectors include respective electrical coupling that are configured to electrically couple to a bus bar attached to the fixed frame. The method may further comprise receiving control signals generated by a control system of the robotic apparatus. The methods may further comprise receiving, by the control system, data generated by one or more environmental sensors, the data describing a position of the robotic apparatus relative to the fixed frame. The methods may further comprise receiving, by the control system, data generated by one or more environmental sensors, the data describing positions of the movable objects relative to the robotic apparatus. The methods may further comprise configuring the robotic apparatus to connect to another robotic apparatus by either the first end effector or the second end effector coupling to either the first end effector or the second end effector of the another robotic apparatus; and further configuring the control system to communicate with a control system of the another robotic apparatus and negotiate a role for the robotic apparatus, the role being a leader role or a follower role, wherein the leader role causes the control system of the robotic apparatus to control the control system of the another robotics apparatus, and wherein the follower role causes the control system of the robotic apparatus to be controlled by the control system of the another robotic apparatus.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The robotic apparatus can traverse various fixed frames with a minimum level of risk of collision with humans and other objects, thus simplifying infrastructure layout that would otherwise be required for floor-mobile robots and gantry robots. The robotic apparatus can adapt to storage facilities as the storage facilities increasing size, as the robotic apparatus utilize the frames of the facilities. In addition, the robotic apparatus can deployed in nearly all exiting storage and manufacturing environments to work in tandem with humans and other existing industrial automation devices such as gantry robots, wheel-based mobile robots, and the like.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
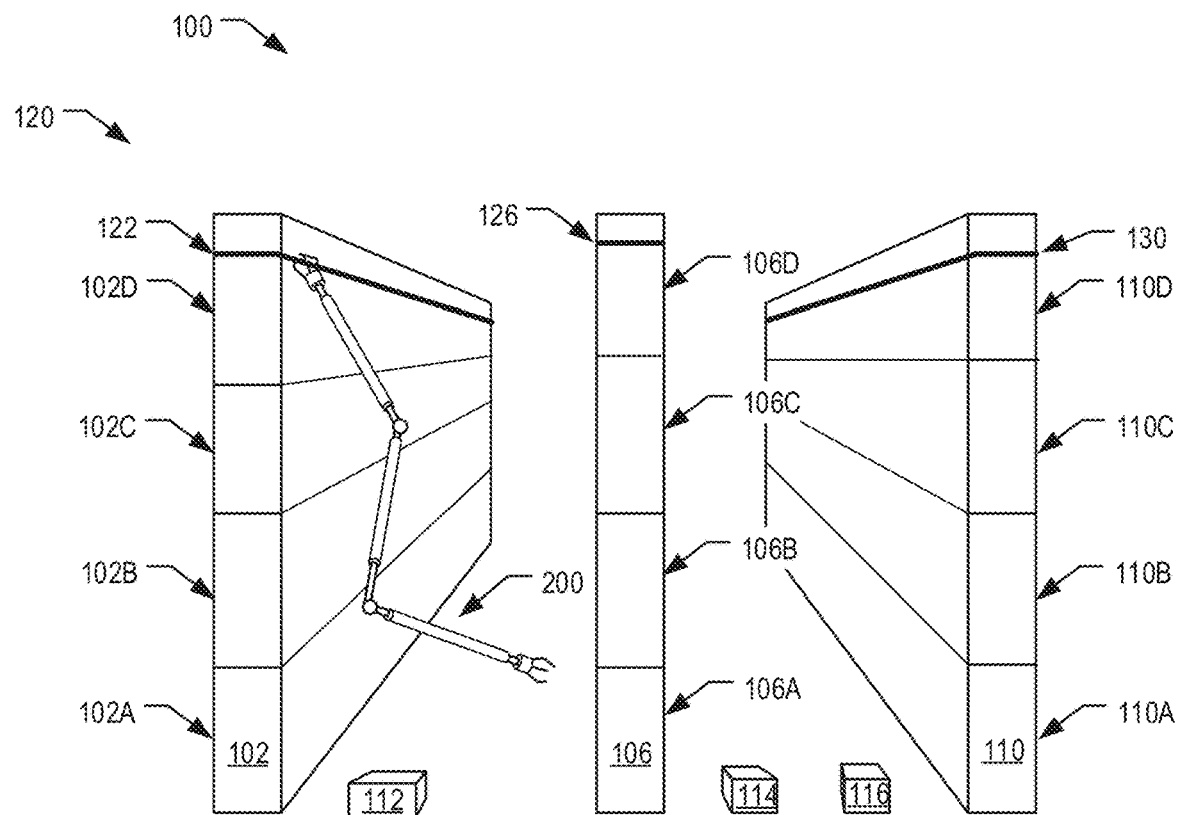
FIGS. 1A and 1B show an example environment in which a robotic apparatus operates.

The specification describes a robotic apparatus that can traverse a fixed frame of a data center and perform pick and place operations to move objects that are stored in the fixed frame. More generally, the robotic apparatus can be implemented in any environment in which a fixed frame stores objects, such as a warehouse or a data center. By use of the rigid body sections, multi-degree of freedom joints, and end effectors, the robotic apparatus can climb and otherwise traverse over a fixed frame without being limited to any particular path.

In operation, a system includes at least one robotic apparatus. The robotic apparatus includes a plurality of rigid body sections, each rigid body section having a pair of first and second distal portions that are oppositely disposed from each other along the rigid body section, and each rigid body section defining a longitudinal axis that runs a length of the rigid body section and intercepts each of the first distal portion and second distal portion.

The robotic apparatus also includes one or more multi-degree of freedom joints, wherein each multi-degree of freedom joint directly couples a respective pair of rigid body sections so that the respective pair of rigid body sections move relative to each other by the multi-degree of freedom joint. In some implementations, the multi-degree of freedom joint is a three-degree of freedom joint, e.g., a spherical joint.

A first end effector is connected to a first distal portion of a first rigid body section. And a second distal portion of the first rigid body section is connected to a multi-degree of freedom joint.

Similarly, a second end effector is connected to a first distal portion of a second rigid body section. And a second distal portion of the second rigid body section is connected to a multi-degree of freedom joint.

In implementations where each of the first and second end effectors is configured to attach to a fixed frame or movable objects, the first and second end effectors are grippers.

In addition, each of the first and second end effectors include respective electrical coupling that are configured to electrically couple to a bus bar attached to the fixed frame, wherein when either the first end effector or the second end effector is electrically coupled to the bus bar, the robotic apparatus receives power from the bus bar.

The system also includes a control system that generates control signals and in response cooperatively operates the one or more multi-degree of freedom joints and the first and second end effectors to cause the robotic apparatus to traverse the fixed frame by alternating attachment to the fixed frame by the first and second end effectors, and to pick and place the movable objects at target positions relative to the fixed frame.

Optionally, the robotic apparatus is configured to connect to another robotic apparatus by either the first end effector or the second end effector coupling to either the first end effector or the second end effector of the another robotic apparatus.

And the control system is further configured to communicate with a control system of the another robotic apparatus and negotiate a role for the robotic apparatus, the role being a leader role or a follower role, wherein the leader role causes the control system of the robotic apparatus to control the control system of the another robotics apparatus, and wherein the follower role causes the control system of the robotic apparatus to be controlled by the control system of the another robotic apparatus.

These features and additional features will be described in more detail below.

FIG. 1A is a diagram of an example environment 100 in which the robotic apparatus described below can traverse and operate. The example environment 100 can be, for instance, a data center in which computer infrastructure equipment and devices like servers, computers, power supplies, and cables are stored.

The example environment 100 includes a fixed frame 120. The fixed frame 120 is a rigid architecture that can be used to store a plurality of components within the frame, e.g., rails, racks, shelves, and other movable objects, including humans. The fixed frame 120 can further be used to define an absolute reference for determining coordinate positions of all components with the frame.

In some embodiments, the fixed frame 120 includes one or more isles of server racks, e.g., 102, 106, and 110. The server racks may be stacked on top of each other, e.g., rack 102A may be in a bottom shelf volume of the fixed frame; rack 102B sits atop 102A; rack 102C atop 102B; and rack 102D atop rack 102C. Accordingly, the rack 102 may be quite tall, e.g., 10 meters or more. Racks 106 and 110 may be similarly configured.

Although only three server racks are depicted in FIG. 1A, the fixed frame 120 may include many more server racks. The fixed frame 120 further includes one or more busbars, e.g., 122, 126, and 130, that distribute electrical power to the server racks. A busbar is a metallic strip or bar that can optionally be enclosed by insulation materials for protection and provides power to the servers in the server racks. Although one busbar is associated with each server rack as depicted in FIG. 1A, the fixed frame 120 may include more or less busbars. That is, depending on actual power consumption by the servers, a busbar is capable of distributing electrical power to one or more server racks.

Each isle of server racks can be as tall as the ceiling of the environment 100 and can store one or more movable objects at various locations within the rack. Each of the movable objects can be, for example, a server, a computer, and so on. As shown in FIG. 1A, 112, 114, and 116 are examples of these movable objects that are to be placed into the racks 102, 106 and 110, e.g., during a maintenance operation.

A robotic apparatus 200 operates within the environment 100. As will be described in more detail below with respect to FIG. 2, the robotic apparatus 200 includes a plurality of rigid body sections, one or more multi-degree of freedom joints, and a pair of end effectors.

In the example implementation where the robotic apparatus 200 is in operation to pick up the movable object 112, as depicted in FIG. 1A, the robotic apparatus 200 may initially be in a configuration where it attaches to the fixed frame 120 with a first end effector attached to the busbar 122 associated with the server rack 102.

As will be described in more detail below with respect to FIG. 4, the robotic apparatus 200 traverses the fixed frame 120 by alternating attachment to the fixed frame, i.e., different server racks, using first and second end effectors.

Figure 1B:
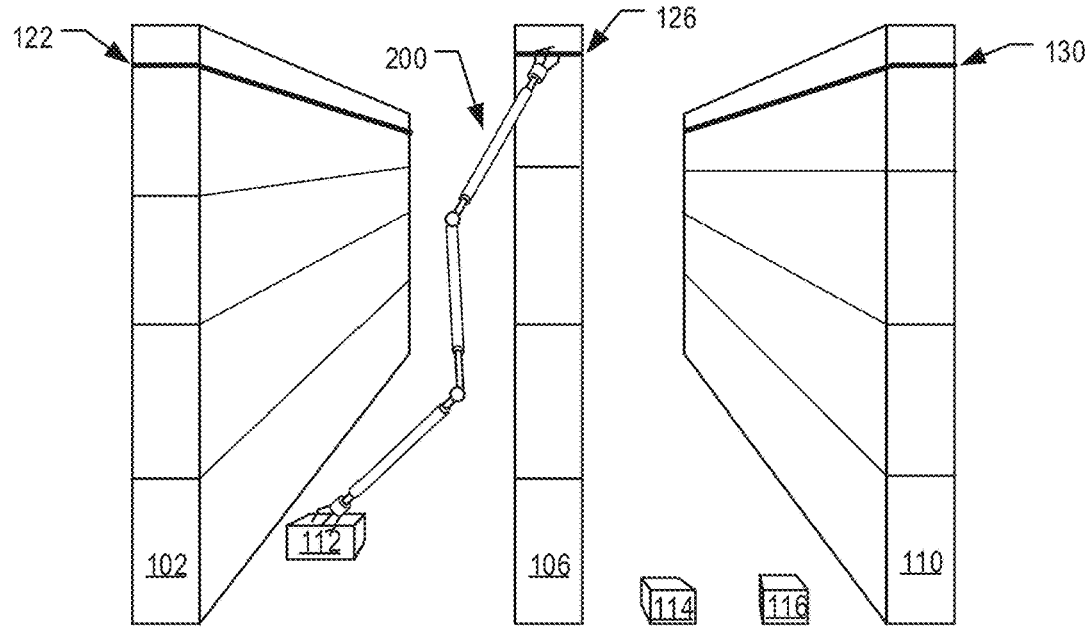

Referring now to FIG. 1B, using a second end effector, the robotic apparatus 200 attaches to the busbar 126 associated with the server rack 106 that may be located at a closer proximity to the movable object 112.

The robotic apparatus 200 then picks up the movable object 112 using the first end effector which is now released from attaching to the busbar 122. At this point, the robotic apparatus 200 completes the example operation of picking up the movable object 112. As a possible next operation, the robotic apparatus 200 may place the object 112 at a different position on a server rack or on the floor level.

Figure 2:
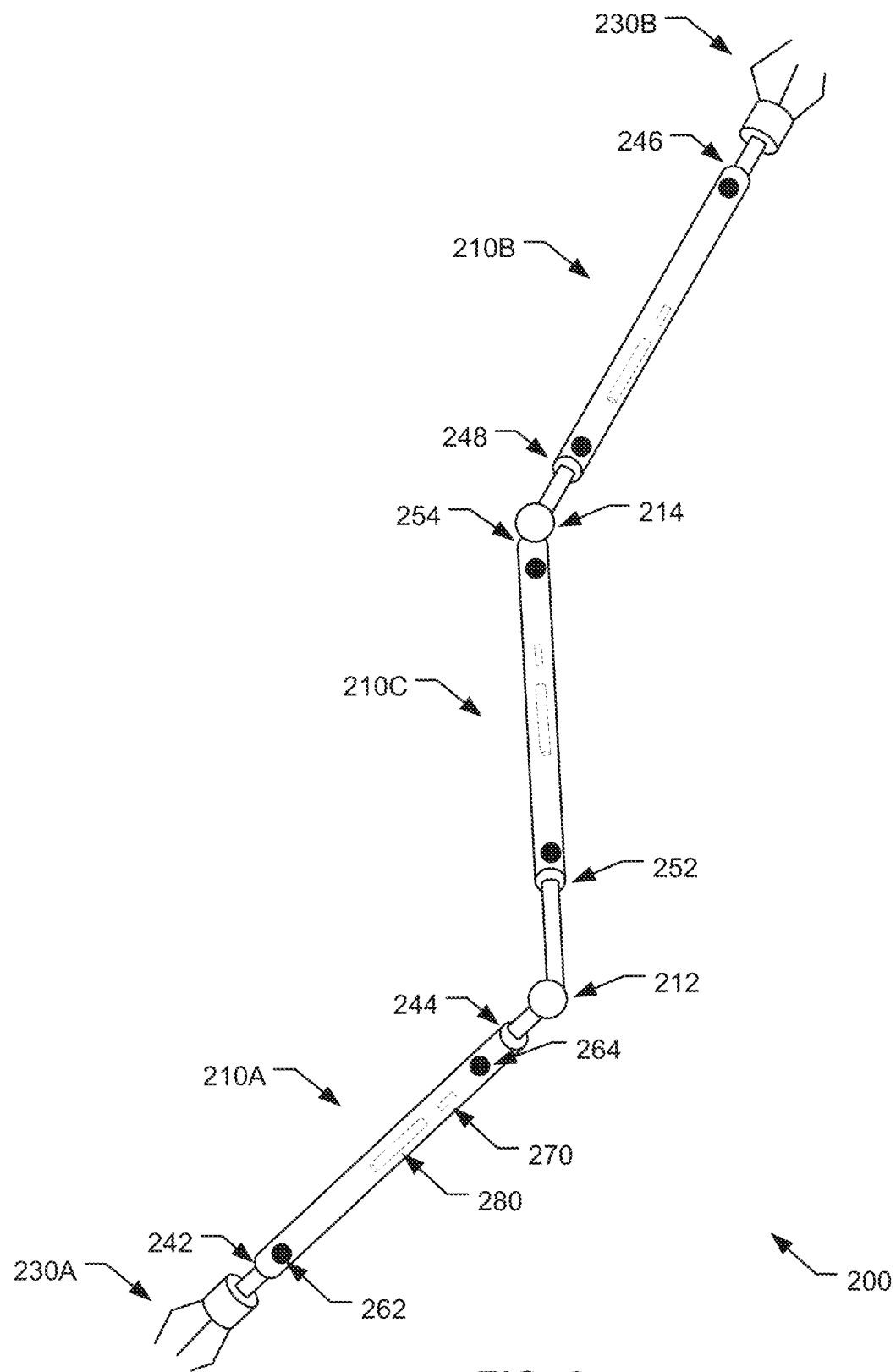
FIG. 2 is a side view of the robotic apparatus of FIG. 1.

FIG. 2 is a side view of the robotic apparatus 200 of FIG. 1. The robotic apparatus 200 is an example of the robotic apparatus that operates in the environment 100 of FIG. 1.

The robotic apparatus 200 includes a plurality of rigid body sections, e.g., 210A-C. Each rigid body section has a pair of first and second distal portions that are oppositely disposed from each other along the rigid body section. Each rigid body section defines a longitudinal axis that runs a length of the rigid body section and intercepts each of the first distal portion and second distal portion. Both the length and cross-sectional circumference of a rigid body section can be in any magnitude that is appropriate for the robotic apparatus 200 to perform certain tasks.

The robotic apparatus 200 includes one or more multi-degree of freedom joints, e.g., 212 and 214. Each multi-degree of freedom joint directly couples a respective pair of rigid body sections so that the respective pair of rigid body sections can move relative to each other by the multi-degree of freedom joint. Each joint can be, for example, a one, two, or three-degree of freedom joint. Generally, a joint with higher degree of freedom allows the robotic apparatus 200 to have greater flexibility in positioning the rigid body sections.

The robotic apparatus further includes a pair of end effectors, e.g., 230A and 230B, that are connected to respective ends of certain rigid body sections. Generally, the end effectors can be any appropriate tools or devices that enable the robotic apparatus 200 to perform certain tasks by interacting with the environment. For example, if the task is an object handling task, the end effectors can be force-closure end effectors, i.e., grippers, that are configurable to attach to the fixed frame and the movable objects. As another example, if the task is a material removal task, the end effectors can be cutting, drilling, or deburring tools. As another example, if the task is an environment measurement task, the end effectors can be environment sensors, e.g., cameras, ultrasonic sensors, and so on.

Although three rigid body sections are depicted in FIG. 2, the robotic apparatus 200 may include more or less rigid body sections. Accordingly, there may be more or less multi-degree of freedom joints required to couple certain pairs of rigid body sections.

In particular, in the example robotics apparatus 200 depicted in FIG. 2, the first rigid body section 230A includes the first distal portion 242 and the second distal portion 244. The first distal portion 242 is connected to the first end effector 230A, and the second distal portion 244 is connected to the multi-degree of freedom joint 212. Similarly, the second rigid body section 210B includes the first distal portion 246 that is connected to the second end effector 230B, and the second distal portion 248 that is connected to the multi-degree of freedom joint 214. The third rigid body section 210C includes the first distal portion 252 that is connected to the multi-degree of freedom joint 212, and the second distal portion 254 that is connected to the multi-degree of freedom joint 214.

In this particular example, both end effectors 230A and 230B are grippers that can be configured to attach to a fixed frame or a movable object. Both multi-degree of freedom joint 212 and 214 are three-degree of freedom joints, i.e., spherical joints. In addition, as will be described below in more detail with respect to FIG. 3, the grippers include electrical coupling that can electrically couple to and receive power from a power source within the fixed frame, i.e., a busbar.

Further, the robotic apparatus 200 includes at least one battery, one control system that includes a data processing apparatus, and optionally, one sensor. In some embodiments, the whole robotic apparatus 200 is powered by one battery and controlled by one control system that receives data from one or more sensors. That is, only a portion of the rigid body sections 210A-C include a battery, a control system, and a sensor.

Alternatively, in the example robotics apparatus 200 depicted in FIG. 2, each of the rigid body sections 210A-C includes a battery, a control system, and two sensors, respectively. Although FIG. 2 depicts the embodiment where the two sensors are physically associated with each rigid body section, there can be more or less sensors associated with each rigid body section. Having remote sensors that are in wireless data communication with the one or more control systems of the robotic apparatus 200, for instance, is an example in which no sensors are physically associated with each rigid body section.

As an example of rigid body sections, the rigid body section 210A includes a control system 270 that generate control signals to operate the first end effector 230A and the three-degree of freedom joint 212, a battery 280 that supplies electric power to the end effector 230A and joint 212, and two sensors 242 and 244 that provide measurement data to the control system 270.

Specifically, the sensors can be environmental sensors that generate measurement data of the environment. For example, the data can describe a coordinate position of the robotic apparatus 200 relative to the fixed frame. As another example, the data can describe coordinate positions of other components stored within the fixed frame, e.g., the movable objects, other robotic apparatuses, and humans, relative to the robotic apparatus 200.

The generated data is then provided to respective control systems. Based on the received data, each control system can generate control signals to respective actuators and motors, and in response cooperatively operates the one or more multi-degree of freedom joints and the first and second end effectors to cause the robotic apparatus 200 to traverse the fixed frame by alternating attachment to the fixed frame by the first and second end effectors, and to pick and place the movable objects at target positions relative to the fixed frame.

In some implementations where two or more robotic apparatuses 200 are present, one robotic apparatus 200 can be configured to connect to another robotic apparatus 200 by either the first end effector 230A or the second end effector 230B coupling to either the first end effector 230A or the second end effector 230B of the another robotic apparatus 200. In this implementation, the control system (e.g., 270) is further configured to communicate with a control system of the another robotic apparatus 200 and negotiate a role for the robotic apparatus 200. The role can either be a leader role or a follower role. The leader role causes the control system of the robotic apparatus 200 to control the control system of the another robotics apparatus 200. Alternatively, the follower role causes the control system of the robotic apparatus 200 to be controlled by the control system of the another robotic apparatus 200.

In such implementations, a connected robotic apparatus can be similarly configured to connect to yet another robotic apparatus 200. In this manner, some or all of the two or more robotic apparatuses 200 that are present can be configured to connect to each other and turn into one connected robotic apparatus.

Figure 3:
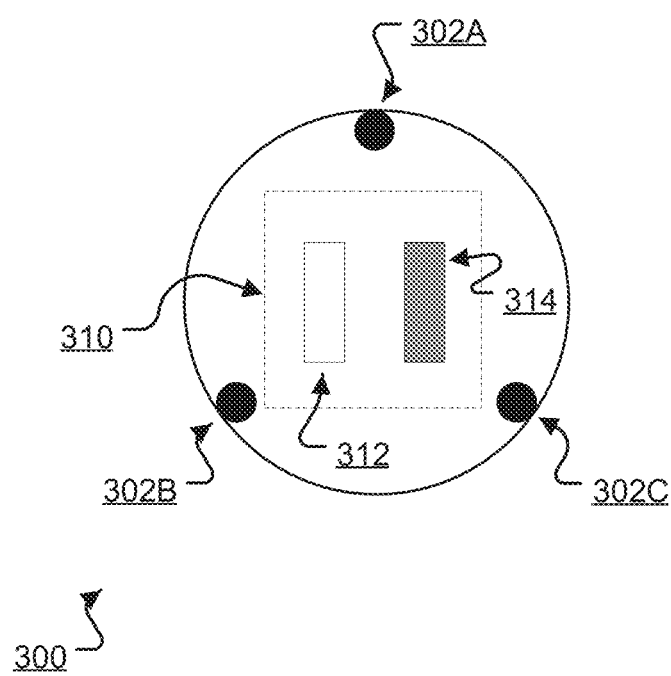
FIG. 3 is a top view of an example embodiment of an end effector of the robotic apparatus of FIG. 1.

FIG. 3 is a top view of an example embodiment of an end effector of the robotic apparatus 200 of FIG. 1. The end effector can be either one of the end effectors 230A-B in FIG. 2. For convenience, the end effector in FIG. 3 will be described as the first end effector 230A.

In general, the end effector 230A is a gripper with electrical coupling. Although 302A-C conceptually depict a three-finger gripper, the gripper can have more or less fingers. A vacuum gripper that attaches to objects using a suction cup, for instance, is a gripper with no fingers.

The electrical coupling is configured to electrically couple to a power source. For example, when the end effector 230A attaches to an uninsulated portion of a busbar, the electrical coupling allows the end effector 230A to electrically couple to the busbar and in turn receives power from the busbar. The received power can then be used to charge, i.e., using the electronic circuitry (not shown), the one or more batteries on board the robotic apparatus. The electrical coupling expands the operation window of the robotic apparatus by ensuring that the on board batteries can be charged while the robotic apparatus is in operation, and therefore reducing downtime due to battery re-charging.

As a particular example of electrical coupling, the electrical coupling 310 includes a left attachment 312 that receives power and a right attachment 314 that connects to neutral. In this particular example, placed along the busbar are pairs of reciprocal attachments, wherein one attachment is connected to the uninsulated portion of the busbar, and the other attachment is connected to neutral.

Figure 4:
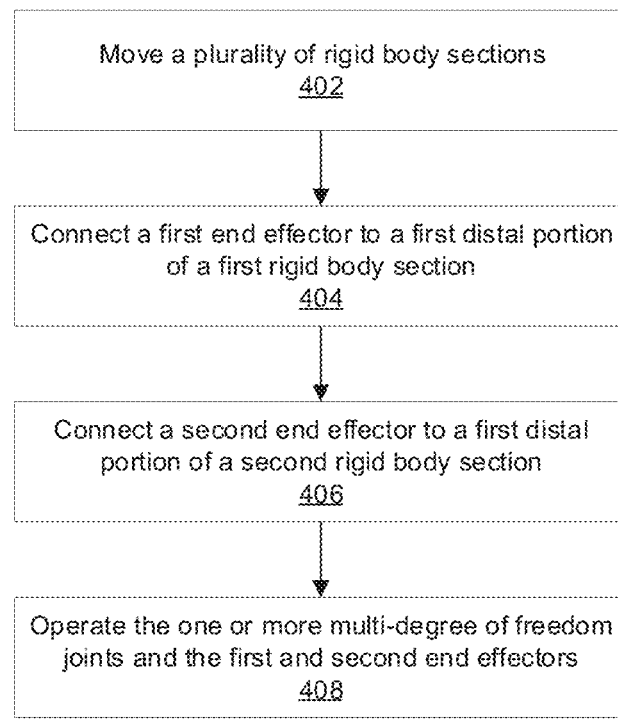
FIG. 4 shows a flow diagram of an example process for operating the robotic apparatus of FIG. 1.

FIG. 4 shows a flow diagram of an example process 400 for operating the robotic apparatus 200 of FIG. 1. For convenience, the process 400 will be described as being performed by a robotic apparatus, e.g., the robotic apparatus 200 of FIG. 1.

In some implementations, the robotic apparatus repeatedly performs each steps 402-408 of the process 400, either alone or in combination, in order to perform certain tasks. For example, a task can be an object pick-and-place task. The task may specify that the robotic apparatus has to pick up a movable object from an initial position, and then place the object at a target position.

As a beginning step, the robotic apparatus moves a plurality of rigid body sections (402). Specifically, moving the plurality of rigid body sections are caused by rotating the three degree of freedom joints that each directly couples a pair of rigid body sections. Each joint can include an actuator that, upon receiving control signals generated by respective control systems, rotates the joint to certain orientations, which in turn causes the rigid body sections to move into certain positions.

The robotic apparatus connects a first end effector to a first distal portion of a first rigid body section (404). The end effector, i.e., gripper, allows the robotic apparatus to have the capability of attaching to a fixed frame or a movable object. In some cases, connecting an end effector to a distal portion of the rigid body section can be performed in conjunction with an end effector changing system.

Similar to the previous step, the robotic apparatus connects a second end effector to a first distal portion of a second rigid body section (406). The robotic apparatus is then able to traverse and operate within a fixed frame with at least one of the end effectors attached to the fixed frame.

The robotic apparatus cooperatively operates the one or more multi-degree of freedom joints and the first and second end effectors (408). In general, the cooperative operation of the joints and end effectors are caused by respective actuators and motors upon receiving the control signals generated by the one or more control systems.

For example, if the control system determines, using inverse kinematics and based on the received sensor data describing an initial position of the object relative to the robotic apparatus, that the object is out of a range of movement of the robotic apparatus, then the control system generates control signals and cause the robotic apparatus to travel towards the object by traversing the fixed frame. Specifically, the control system causes the robotic apparatus to traverse the fixed frame by alternating attachment to the fixed frame by first and second end effectors.

As another example, if the control system determines that the object that needs to be picked up is within the range of movement of the robotic apparatus, the control system generates control signals to cause a first end effector to attach to the object, and a second end effector to remain attached to the fixed frame.

As another example, after picking up the object, if the control system further determines that a target position for placing the object is within the range of movement of the robotic apparatus, the control system generates control signals to cause the robotic apparatus to place the object at the target position, and to release attachment of the end effector that is attaching to the object.

As another example, the control system determines that one single robotic apparatus is incapable of performing the object pick-and-place task, e.g., upon determining that after the robotic apparatus has picked up the object with an end effector, a target position for placing the object would be out of a range of movement the robotic apparatus. In this example, the control system of the robotic apparatus can further determine that the robotic apparatus needs to connect to another robotic apparatus that is present within the same fixed frame, by either the first end effector or the second end effector coupling to either the first end effector or the second end effector of the another robotic apparatus. The control system is further configured to communicate with a control system of the another robotic apparatus and negotiate a role for the robotic apparatus. The role can either be a leader role or a follower role. The leader role causes the control system of the robotic apparatus to control the control system of the another robotics apparatus. Alternatively, the follower role causes the control system of the robotic apparatus to be controlled by the control system of the another robotic apparatus.

The connected robotic apparatus which now has a greater range of movement then proceeds to perform the object pick-and-place task, i.e., following similar examples as described above. More specifically, upon receiving corresponding control signals, the connected robotic apparatus can either (i) attach to an object using a first end effector while remaining attached to the fixed frame using a second end effector, or (ii) cooperatively operate the multi-freedom joints to traverse the fixed frame.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A data center system, comprising:
 a fixed frame comprising a plurality of shelves, and within each shelf is a server rack that includes a plurality of servers;
 a bus bar attached to the fixed frame; and
 a robotic apparatus, comprising:
  a plurality of rigid body sections, each rigid body section having a pair of first and second distal portions that are oppositely disposed from each other along the rigid body section, and each rigid body section defining a longitudinal axis that runs a length of the rigid body section and intercepts each of the first distal portion and second distal portion, each rigid body section directly connected to another rigid body section by a multi-degree of freedom joint forming a respective pair of rigid body sections so that the respective pair of rigid body sections move relative to each other by the multi-degree of freedom joint;

a first end effector connected to a first distal portion of a first rigid body section, wherein a second distal portion of the first rigid body section is connected to a multi-degree of freedom joint; and a second end effector connected to a first distal portion of a second rigid body section, wherein a second distal portion of the second rigid body section is connected to a multi-degree of freedom joint;

wherein:

each of the first and second end effectors is configured to attach to a fixed frame, and is also configured to attach to a server; and a control system that generates control signals and in response cooperatively operates the one or more multi-degree of freedom joints and the first and second end effectors to cause the robotic apparatus to traverse the fixed frame by alternating attachment to the fixed frame by the first and second end effectors, and to pick and place the servers at target positions relative to the fixed frame; and at least one of the first and second end effectors includes an electrical coupling that is configured to electrically couple to the bus bar attached to the fixed frame of the storage facility, wherein when so electrically coupled to the bus bar, the robotic apparatus receives power from the bus bar.

2. The data center system of claim 1, the robotic apparatus further comprising:

one or more environmental sensors that generate data that describes a position of the robotic apparatus relative to the fixed frame.

3. The data center system of claim 2, wherein the one or more environmental sensors further generate data that describe positions of the movable objects relative to the robotic apparatus.

4. The data center system of claim 1, wherein each multi-degree of freedom joint is a three-degree of freedom joint.

5. The data center system of claim 4, wherein each multi-degree of freedom joint is a single joint.

6. The data center system of claim 1, wherein the plurality of rigid body sections includes at least three rigid body sections.

7. The data center system of claim 1, wherein the first and second end effectors are grippers.

8. The data center system of claim 1, wherein:

the robotic apparatus is configured to connect to another robotic apparatus by either the first end effector or the second end effector coupling to either the first end effector or the second end effector of the another robotic apparatus; and the control system is further configured to communicate with a control system of the another robotic apparatus and negotiate a role for the robotic apparatus, the role being a leader role or a follower role, wherein the leader role causes the control system of the robotic apparatus to control the control system of the another robotics apparatus, and wherein the follower role causes the control system of the robotic apparatus to be controlled by the control system of the another robotic apparatus.

9. The data center system of claim 1, wherein each multi-degree of freedom joint is a single joint.

* * * * *